(12) United States Patent
Xu et al.

(10) Patent No.: US 11,349,973 B2
(45) Date of Patent: May 31, 2022

(54) DISPLAY APPARATUS AND OPERATING METHOD THEREOF

(71) Applicants: Beijing BOE Optoelectronics Technology Co., Ltd., Beijing (CN); BOE Technology Group Co., Ltd., Beijing (CN)

(72) Inventors: Junjie Xu, Beijing (CN); Dawei Wang, Beijing (CN); Chao Yu, Beijing (CN); Jianye Tang, Beijing (CN); Yadong Zhang, Beijing (CN); Jingfei Mu, Beijing (CN); Jianwu Wu, Beijing (CN); Gaowei Chen, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 329 days.

(21) Appl. No.: 16/605,271

(22) PCT Filed: Apr. 9, 2019

(86) PCT No.: PCT/CN2019/081944
§ 371 (c)(1),
(2) Date: Oct. 15, 2019

(87) PCT Pub. No.: WO2019/205930
PCT Pub. Date: Oct. 31, 2019

(65) Prior Publication Data
US 2021/0368034 A1     Nov. 25, 2021

(30) Foreign Application Priority Data
Apr. 23, 2018 (CN) .......................... 201810368658.6

(51) Int. Cl.
*H04M 1/00* (2006.01)
*H04M 1/02* (2006.01)

(52) U.S. Cl.
CPC .................................. *H04M 1/0266* (2013.01)

(58) Field of Classification Search
CPC .............. H04M 1/0266; H04M 1/0264; H04B 1/3833; H04B 1/38
(Continued)

(56) References Cited

U.S. PATENT DOCUMENTS

| | | | |
|---|---|---|---|
| 7,386,282 B2* | 6/2008 | Kim .................... | H04M 1/0214 455/90.3 |
| 7,386,331 B2* | 6/2008 | Hyun ................... | H04M 1/0264 455/575.4 |

(Continued)

FOREIGN PATENT DOCUMENTS

| CN | 203984539 U | 12/2014 |
|---|---|---|
| CN | 107315268 A | 11/2017 |

(Continued)

OTHER PUBLICATIONS

Sep. 4, 2019—(CN) First Office Action Appn 201810368658.6 with English Translation.

*Primary Examiner* — April G Gonzales
(74) *Attorney, Agent, or Firm* — Banner & Witcott, Ltd.

(57) ABSTRACT

Embodiments of the present disclosure provides a display apparatus and an operating method of the display apparatus. The display apparatus includes an apparatus body, a first display screen and a device module, the first display screen and the device module are arranged on the apparatus body, the device module includes a second display screen and a functional device, the functional device is positioned in a non-light-exiting direction of the second display screen, the first display screen and the device module are rotatable relatively, so that the first display screen and the second (Continued)

display screen are positioned on an identical side of the display apparatus.

18 Claims, 5 Drawing Sheets

(58) Field of Classification Search
 USPC .................................... 455/90.3, 575.3, 566
 See application file for complete search history.

(56) References Cited

U.S. PATENT DOCUMENTS

| | | | | |
|---|---|---|---|---|
| 7,411,627 B2* | 8/2008 | Jeong | ................. | H04M 1/0264 348/374 |
| 7,450,841 B2* | 11/2008 | Jung | ..................... | G03B 17/04 396/429 |
| 7,489,778 B2* | 2/2009 | Lee | .................... | H04M 1/0264 379/433.13 |
| 7,555,312 B2* | 6/2009 | Kim | .................... | H04M 1/0241 455/556.1 |
| 8,159,592 B2* | 4/2012 | Joo | ..................... | H04M 1/0264 348/333.06 |
| 8,229,500 B2* | 7/2012 | Joo | ..................... | H04M 1/0241 455/556.1 |
| 9,288,471 B1* | 3/2016 | Yang | ....................... | G06F 3/017 |
| 9,491,338 B1* | 11/2016 | Garcia | ................ | H04N 5/2252 |
| 2005/0014527 A1* | 1/2005 | Chambers | ........... | H04N 5/2354 455/556.1 |
| 2016/0094693 A1* | 3/2016 | Song | ................... | H04M 1/0268 455/575.1 |

FOREIGN PATENT DOCUMENTS

| | | |
|---|---|---|
| CN | 107911514 A | 4/2018 |
| CN | 108111735 A | 6/2018 |
| CN | 108600449 A | 9/2018 |
| WO | 2008102462 A1 | 8/2008 |

* cited by examiner

DISPLAY APPARATUS AND OPERATING METHOD THEREOF

The application is a U.S. National Phase Entry of International Application No. PCT/CN2019/081944 filed on Apr. 9, 2019, designating the United States of America and claiming priority to Chinese Patent Application No. 201810368658.6, filed Apr. 23, 2018. The present application claims priority to and the benefit of the above-identified applications and the above-identified applications are incorporated by reference herein in their entirety.

TECHNICAL FIELD

Embodiments of the present disclosure relate to a display apparatus and an operating method thereof.

BACKGROUND

With development of display technologies, requirement for a display effect of a display apparatus is becoming higher and higher. If a screen-to-body ratio of the display apparatus is relatively large, the display apparatus has a better display effect.

In related arts, devices such as an earpiece, a camera, a flash lamp and the like are usually arranged on a side where a display screen of the display apparatus (e.g., a mobile phone) is positioned, and the display screen cannot be arranged at the positions where those devices are arranged.

The devices such as the earpiece, the camera, the flash lamp and the like are necessary for the display apparatus, and thus, only an area of the display screen is reduced to make the screen-to-body ratio of the display apparatus relatively small, but the display effect of the display apparatus is poor.

SUMMARY

In a first aspect, an embodiment of the present disclosure provides a display apparatus, the display apparatus comprises: an apparatus body; a first display screen, arranged on the apparatus body; and a device module, arranged on the apparatus body, the device module includes a second display screen and a functional device positioned in a non-light-exiting direction of the second display screen, the first display screen and the device module are rotatable relatively, so that the first display screen and the second display screen are positioned on an identical side of the display apparatus.

Optionally, in the display apparatus provided by an embodiment of the present disclosure, the device module is rotatable with respect to the apparatus body, so that the first display screen and the second display screen are positioned on the identical side of the display apparatus.

Optionally, in the display apparatus provided by an embodiment of the present disclosure, the device module is rotatable with respect to the apparatus body, so that the second display screen is switchable between in the identical side of the apparatus device with the first display screen and in a different side from the first display screen.

Optionally, in the display apparatus provided by an embodiment of the present disclosure, the second display screen is switchable between in the identical side of the apparatus body with the first display screen and in an opposite side to the first display screen.

Optionally, in the display apparatus provided by an embodiment of the present disclosure, the device module is rotatable to enable a light-exiting surface of the first display screen and a light-exiting surface of the second display screen to be coplanar.

Optionally, in the display apparatus provided by an embodiment of the present disclosure, the functional device and the second display screen are arranged oppositely.

Optionally, in the display apparatus provided by an embodiment of the present disclosure, the apparatus body has a first surface and a second surface which are arranged oppositely and a third surface connecting the first surface and the second surface, a through groove penetrating the first surface and the second surface is formed on the third surface, and the first display screen is arranged on the first surface, and the device module is arranged in the through groove.

Optionally, in the display apparatus provided by an embodiment of the present disclosure, the device module and the through groove are identical in size and shape.

Optionally, in the display apparatus provided by an embodiment of the present disclosure, the display apparatus further comprises a connector, the device module is connected with the apparatus body by the connector, and the connector is extendable and retractable along a direction perpendicular to the third surface.

Optionally, in the display apparatus provided by an embodiment of the present disclosure, the connector includes a rotating shaft, a rotating head connected to the rotating shaft and a telescopic part connected to the rotating head and connected with the apparatus body, the device module is pivoted with the connector by the rotating shaft, and is rotatable with respect to the rotating shaft, and the telescopic part is extendable and retractable along the direction perpendicular to the third surface.

Optionally, in the display apparatus provided by an embodiment of the present disclosure, the rotating shaft is fixed to the rotating head, the rotating head is fixed to the telescopic part, an accommodating groove is formed on a side wall of the through groove, and both the rotating head and the telescopic part are positioned in the accommodating groove.

Optionally, in the display apparatus provided by an embodiment of the present disclosure, a surface of the device module which is close to the rotating head is a fourth surface, and a center of an orthographic projection region of the rotating head on the fourth surface of the device module coincides with a center of the fourth surface.

Optionally, in the display apparatus provided by an embodiment of the present disclosure, the accommodating groove does not communicate with a side of the apparatus body where the third surface is positioned.

Optionally, in the display apparatus provided by an embodiment of the present disclosure, the rotating shaft is fixed to the rotating head, the rotating head is fixed to the telescopic part, an accommodating groove is formed on a side wall of the through groove, and the rotating head, the telescopic part and a part of the rotating shaft are positioned in the accommodating groove.

Optionally, in the display apparatus provided by an embodiment of the present disclosure, the display apparatus further comprises a connecting wire, a number of the connectors is two, both ends of the device module are respectively connected with the apparatus body by two connectors, the rotating shaft is of a hollow cylinder shape, the rotating head is provided with a through hole corresponding to a hollow region in the rotating shaft, and the connecting wire passes through the hollow region and the through hole, and is electrically connected with the apparatus body and the device module.

Optionally, in the display apparatus provided by an embodiment of the present disclosure, the telescopic part is a spring.

Optionally, in the display apparatus provided by an embodiment of the present disclosure, the functional device includes at least one of a camera, a flash lamp and an earpiece.

Optionally, in the display apparatus provided by an embodiment of the present disclosure, the first display screen is a main display screen, and the second display screen is an auxiliary display screen.

In a second aspect, an embodiment of the present disclosure provides an operating method of the display apparatus as mentioned in the first aspect, the operating method comprises under a condition that the functional device is not used, performing a relative rotation of the first display screen and the device module, so as to enable the first display screen and the second display screen to be positioned on an identical side of the display apparatus.

Optionally, in the operating method of the display apparatus provided by an embodiment of the present disclosure, under a condition that the functional device is not used, the performing a relative rotation of the first display screen and the device module, so as to enable the first display screen and the second display screen to be positioned on an identical side of the display apparatus includes: rotating the device module to enable the first display screen and the second display screen to be positioned on the identical side of the display apparatus.

Optionally, in the operating method of the display apparatus provided by an embodiment of the present disclosure, the display apparatus further includes a connector, the device module is connected with the apparatus body by the connector, the connector includes a rotating shaft, a rotating head connected to the rotating shaft and a telescopic part connected to the rotating head and connected with the apparatus body, the device module is pivoted with the connector by the rotating shaft, and is rotatable with respect to the rotating shaft, wherein the telescopic part is extendable and retractable along a direction perpendicular to the third surface, and the rotating the device module to enable the first display screen and the second display screen to be positioned on the identical side of the display apparatus includes: extending the telescopic part of the connector along the direction perpendicular to the third surface by utilizing an external force, to enable the device module to be away from the apparatus body along the direction perpendicular to the third surface; rotating the device module with respect to the apparatus body so as to enable the first display screen and the second display screen to be positioned on the identical side of the display apparatus; and retracting the telescopic part of the connector and driving the device module to be attached to the apparatus body by removing the external force.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

Figure 1:
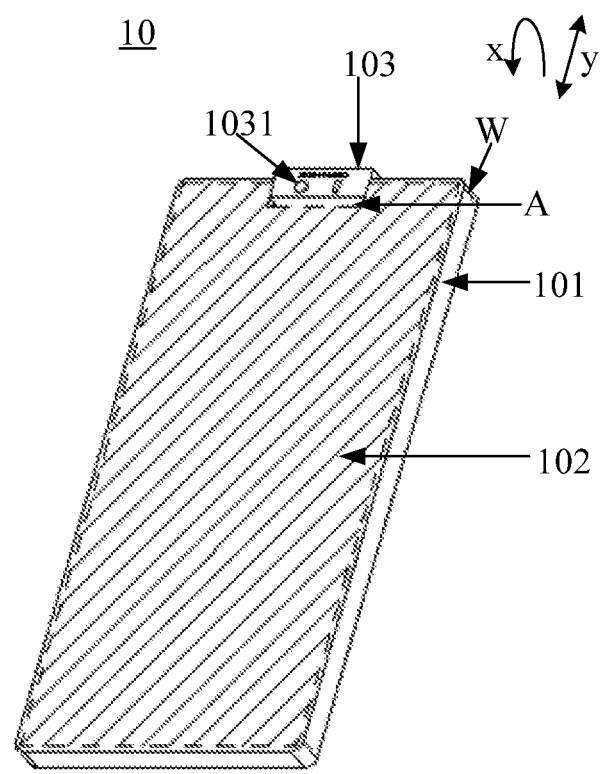
FIG. 1 is a structural schematic diagram of a display apparatus provided by an embodiment of the present disclosure.

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may include an electrical connection/coupling, directly or indirectly. The terms, "on," "under," "left," "right," or the like are only used to indicate relative position relationship, and when the position of the object which is described is changed, the relative position relationship may be changed accordingly.

With development of display technologies, in order to achieve a better display effect of a display apparatus, the display apparatus needs to have a relatively large screen-to-body ratio. Devices such as an earpiece, a camera, a flash lamp and the like need to be arranged on a side where a display screen of the display apparatus is positioned, and those devices are necessary for the display apparatus, and thus, those devices generally can occupy a part of an area for arranging the display screen so as to limit the screen-to-body ratio of the display apparatus. For a display apparatus provided by an embodiment of the present disclosure, the display screen also may be arranged in a region where those devices are arranged, so as to increase the screen-to-body ratio of the display apparatus, thereby improving the display effect of the display apparatus.

The display apparatus provided by the embodiment of the present disclosure includes: an apparatus body; a first display screen, which is arranged on the apparatus body; and a device module, which is arranged on the apparatus body, the device module including: a second display screen; and a functional device, which is positioned in a non-light-exiting direction of the second display screen, wherein the first display screen and the device module are rotatable relatively, so that the first display screen and the second display screen are positioned on the same side of the display apparatus.

For example, the device module is rotatable with respect to the apparatus body, so that the first display screen and the second display screen are positioned on the same side of the display apparatus.

For example, the device module is rotatable with respect to the apparatus body, so that the second display screen is switchable between being at the same side of the apparatus body with the first display screen and being at the different side of the apparatus body from the first display screen.

For example, the second display screen is switchable between being at the same side of the apparatus body with the first display screen and being at the opposite side of the apparatus body opposite to the first display screen.

For example, the first display screen herein may be a main display screen, i.e., a primary display screen which is a display screen with a large occupied area, and the second display screen may be an auxiliary display screen, i.e., a display screen with a small occupied area.

FIG. 1 is a structural schematic diagram of a display apparatus provided by an embodiment of the present disclosure. As shown in FIG. 1, the display apparatus 10 includes: an apparatus body 101, a main display screen 102 and a device module 103, and both the main display screen 102 and the device module 103 are arranged on the apparatus body 101.

Exemplarily, the apparatus body 101 has a first surface and a second surface which are arranged oppositely (the first surface and the second surface are not shown in FIG. 1), and a third surface W connecting the first surface and the second surface, and the main display screen 102 may be arranged on the first surface.

The device module 103 includes: an auxiliary display screen (not shown in FIG. 1) and a functional device 1031, and the functional device 1031 is positioned in a non-light-exiting direction of the auxiliary display screen, for example, on an opposite side to the auxiliary display screen, or an adjacent side of the auxiliary display screen. The device module 103 is capable of rotating to enable the auxiliary display screen and the main display screen 102 to be positioned on the same side of the display apparatus 10. Exemplarily, the device module 103 is capable of being rotated along an x direction as shown in FIG. 1 or an opposite direction of the x direction, and the functional device 1031 may include: at least one of a camera, a flash lamp and an earpiece. The x direction is a direction where rotation is carried out around a preset axis, and the preset axis is simultaneously parallel to the first surface (i.e., a main display screen setting face) and the third surface W of the apparatus body.

For example, in the embodiment of the present disclosure, the first display screen also may be rotatable with respect to the device module, or the device module also may be rotatable with respect to the first display screen, as long as it can be achieved that the first display screen and the second display screen are positioned on the same side of the display apparatus together.

The display apparatus (e.g., a mobile phone) generally includes two cameras, of which a front camera is positioned on a side where the main display screen of the display apparatus is positioned, and a rear camera in the two cameras is positioned on the opposite side to the main display screen.

It should be noted that FIG. 1 shows a state of the display apparatus when the device module is about to rotate. In the display apparatus provided by the embodiment of the present disclosure, the device module is rotatable, and when the front camera is used, the device module may be rotated to enable the functional device to be positioned on a side where the main display screen of the display apparatus is positioned; and when the rear camera is used, the device module may be rotated to enable the functional device to be positioned on the opposite side to the main display screen in the display apparatus, so that only one camera needs to be arranged for the display apparatus, thereby reducing the number of components of the display apparatus.

Moreover, when the front camera, the earpiece or the flash lamp is not used, in the embodiment of the present disclosure, the auxiliary display screen may be positioned on the side where the main display screen of the display apparatus is positioned, so as to increase an area of a display region of the display apparatus.

For example, the device module may be set to mate with the apparatus body so as to seamlessly connect with the apparatus body.

From the above, the device module in the display apparatus provided by the embodiment of the present disclosure includes: an auxiliary display screen and a functional device, and the functional device is positioned in a non-light-exiting direction of the auxiliary display screen; and the device module is rotatable to enable the auxiliary display screen and the main display screen of the display apparatus to be positioned on the same side of the display apparatus. Therefore, when the functional device is not used, the auxiliary display screen and the main display screen can be positioned on the same side of the display apparatus, and at the moment, a total area of the display screen of the display apparatus, which is capable of displaying, is relatively large, i.e., the screen-to-body ratio of the display apparatus is increased, so as to improve the display effect of the display apparatus.

Optionally, with further reference to FIG. 1, a through groove A penetrating the first surface and the second surface may be formed on the third surface W of the apparatus body, and the device module 103 may be arranged in the through groove A and connected with the apparatus body 101.

For example, the device module may be set to exactly match the through groove in shape, the device module and the through groove are the same in size and shape, and the shape and the size of the device module may be set according to the through groove so as to achieve a case that when the device module and the apparatus body are tightly combined, from a user's view, the apparatus body and the device module form a complete outline and it seems that there is no boundary therebetween. Certainly, the size and the shape of the device module may be slightly different from those of the through groove, as long as usage cannot be influenced, and may be just the visual effect is slightly different.

For example, the device module is capable of being rotated to enable a light-exiting surface of the main display screen and a light-exiting surface of the auxiliary display screen to be coplanar.

Figure 2:
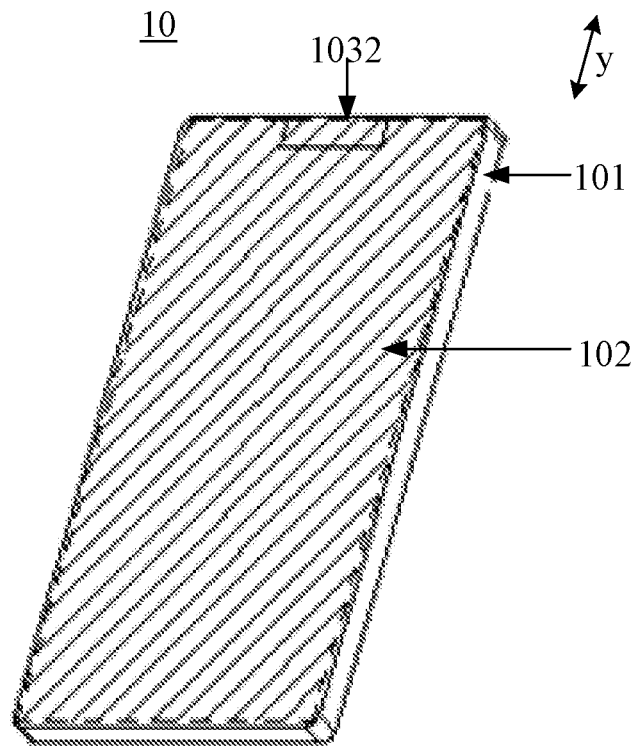
FIG. 2 is a structural schematic diagram of another display apparatus provided by an embodiment of the present disclosure.

FIG. 2 shows a structural schematic diagram of the display apparatus after the device module rotates. As shown in FIG. 2, the light-exiting surface of the main display screen 102 and the light-exiting surface of the auxiliary display screen 1032 are coplanar, and the device module is matched with the through groove A on the display apparatus, and thus, a gap between the main display screen and the auxiliary display screen is small, the sealing performance of the display apparatus is good, and at the moment, the main display screen and the auxiliary display screen can constitute one large display screen together, so that the display apparatus can display more information, thereby improving the display effect of the display apparatus.

Optionally, the display apparatus may further include: a connector; the device module may be connected with the apparatus body by the connector; and the connector is extendable and retractable along a direction perpendicular to the third surface.

In order to prevent a case that when the device module is of a cube shape and the device module is matched with the through groove in shape, the device module cannot directly rotate, the connector may be configured to be extendable and retractable along the direction (i.e., a y direction) perpendicular to the third surface, so that the device module can move along the direction perpendicular to the third surface under the action of an external force, and drive the connector to extend and retract along the y direction.

Figure 3:
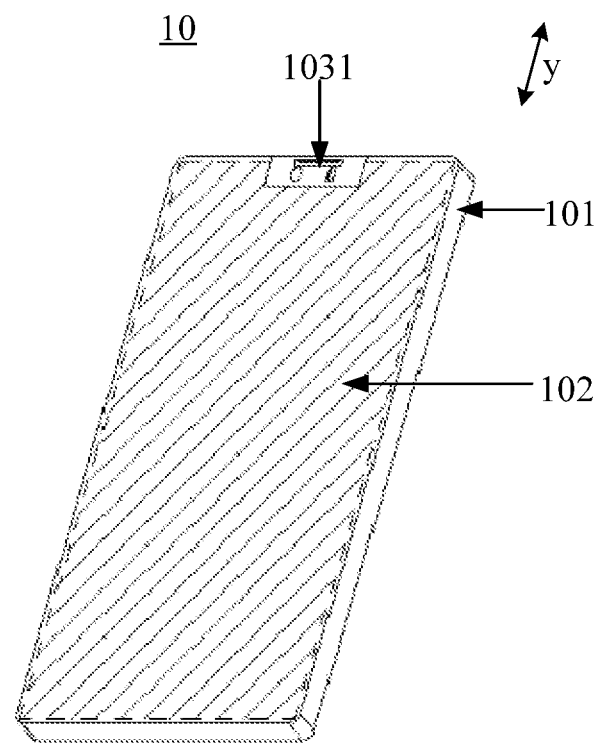
FIG. 3 is a structural schematic diagram of yet another display apparatus provided by an embodiment of the present disclosure.
Figure 4:
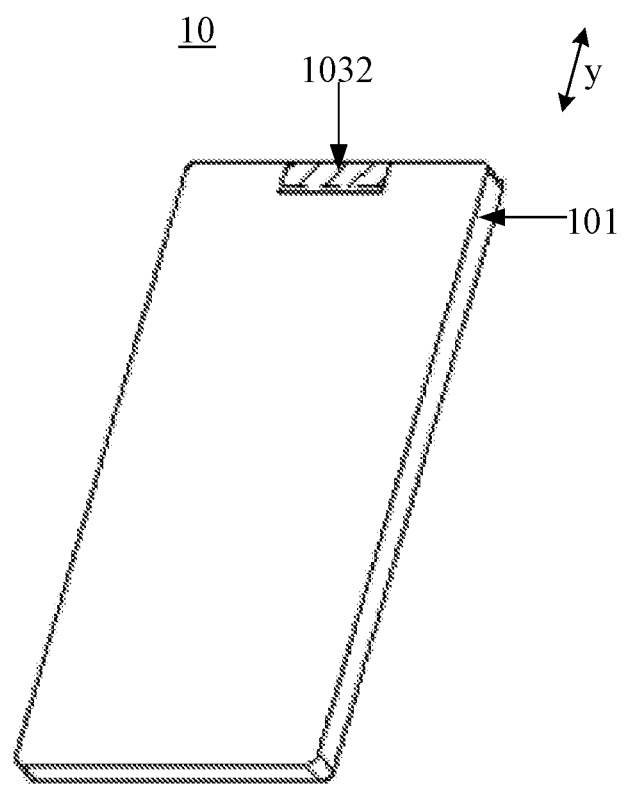
FIG. 4 is a structural schematic diagram of still a further display apparatus provided by an embodiment of the present disclosure.

Exemplarily, assuming that the auxiliary display screen and the functional device of the device module are arranged oppositely, FIG. 3 shows a view of the display apparatus on the side where the functional device is positioned, and FIG. 4 shows a view of the display apparatus on the side where the auxiliary display screen is positioned. In connection with FIG. 3 and FIG. 4, when the functional device 1031 and the main display screen 102 are positioned on the same side of the display apparatus, the auxiliary display screen 1032 is positioned on the opposite side to the main display screen 102. When the device module in FIG. 3 needs to be rotated, the user may apply an external force to the device module (e.g., lift the device module along the y direction in FIG. 3) to enable the connector to extend, so that a state of the device module is as shown in FIG. 1. Then, the device module may be rotated by 180 degrees along the x direction as shown in FIG. 1 so as to enable the light-exiting surface of the auxiliary display screen and the light-exiting surface of the main display screen to be coplanar, and at the moment, the state of the display apparatus may be as shown in FIG. 2.

It should be noted that the embodiments of the present disclosure only take the case that the user lifts the device module so as to rotate the device module as an example, and in the practical application, when the device module needs to rotate, the display apparatus also may control the connector to extend and control the device module to rotate according to a rotating instruction. In addition, when the light-exiting surface of the auxiliary display screen and the light-exiting surface of the main display screen are coplanar, the auxiliary display screen and the main display screen can be matched together to obtain a larger area of display region so as to display more information, thereby improving the display effect of the display apparatus. When the light-exiting surface of the auxiliary display screen and the light-exiting surface of the main display screen are not coplanar, if the auxiliary display screen and the main display screen are positioned on different sides of the display apparatus, the auxiliary display screen may not work, i.e., not display the information; or, the auxiliary display screen also may display customized information according to settings, e.g., the auxiliary display screen may display current time, weather forecast information or a notification message and the like.

Figure 5:
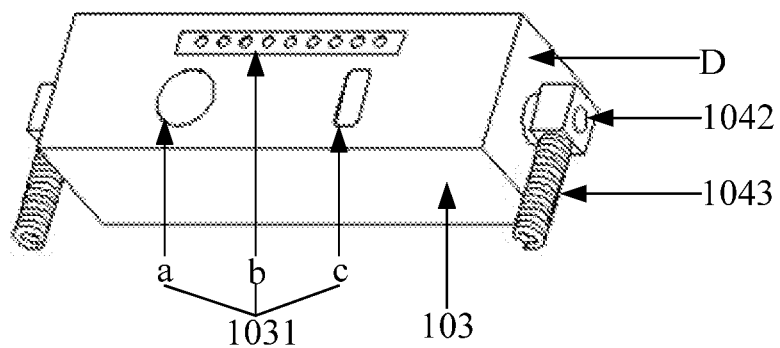
FIG. 5 is a structural schematic diagram of a device module and a connector provided by an embodiment of the present disclosure.
Figure 6:
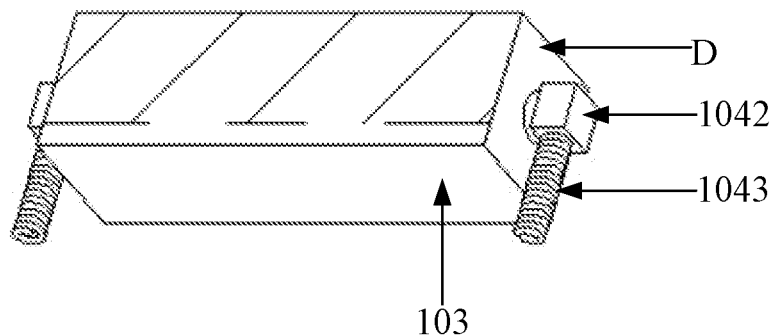
FIG. 6 is a structural schematic diagram of another device module and a connector provided by an embodiment of the present disclosure.

Optionally, FIG. 5 and FIG. 6 show structural schematic diagrams of a device module and a connector. In connection with FIG. 5 and FIG. 6, the device module includes a functional device 1031 and an auxiliary display screen 1032, the auxiliary display screen 1032 and the functional device 1031 are arranged oppositely, and the functional device 1031 includes: a camera a, an earpiece b and a flash lamp c. It should be noted that the embodiments of the present disclosure only take a case that the auxiliary display screen and the functional device are arranged oppositely and the functional device includes the camera, the earpiece and the flash lamp as an example, and in the practical application, the auxiliary display screen and the functional device also may be respectively arranged on two adjacent surfaces in the device module, at the moment, the device module may be of a regular quadrangular prism shape, the functional device also may only include the earpiece and the camera, and the embodiments of the present disclosure do not make any limit thereto.

For example, the connector includes: a rotating shaft; a rotating head, which is connected to the rotating shaft; a telescopic part, which is connected to the rotating head and connected with the apparatus body, wherein the device module is pivoted with the connector by the rotating shaft, and is rotatable with respect to the rotating shaft, wherein the telescopic part is extendable and retractable along the direction perpendicular to the third surface.

For example, the rotating shaft is fixed to the rotating head, the rotating head is fixed to the telescopic part, an accommodating groove is formed on the side wall of the through groove, and both the rotating head and the telescopic part are positioned in the accommodating groove.

Figure 7:
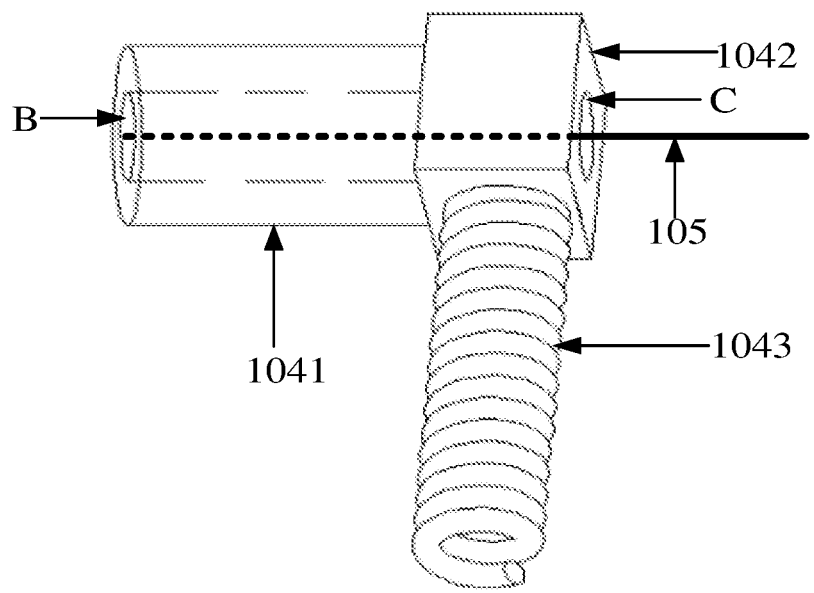
FIG. 7 is a structural schematic diagram of a connector provided by an embodiment of the present disclosure.

FIG. 7 shows a structural schematic diagram of a connector. As shown in FIG. 7, the connector may include: a rotating shaft 1041, a rotating head 1042 and a telescopic part 1043 which are sequentially connected.

For example, the rotating shaft 1041 may be of a hollow cylinder shape, the rotating head 1042 may be of a shape of rectangle or circle and the like, and the rotating head 1042 may be provided with a through hole C corresponding to a hollow region B in the rotating shaft 1041. In connection with FIG. 5 and FIG. 7, or in connection with FIG. 6 and FIG. 7, the device module 103 may be sleeved with the rotating shaft 1041, and the device module 103 may rotate around the rotating shaft 1041. In addition, assuming that a surface of the device module 103, which is close to the rotating head 1042, is a fourth surface D, the center of an orthographic projection region of the rotating head 1042 on the fourth surface D may coincide with the center of the fourth surface D, and the central axis of the rotating shaft 1041 also may coincide with the center of the fourth surface D. Therefore, after the device module rotates, the rotating head also can return to an original position, and a spring also can return to an original state.

Figure 8A:
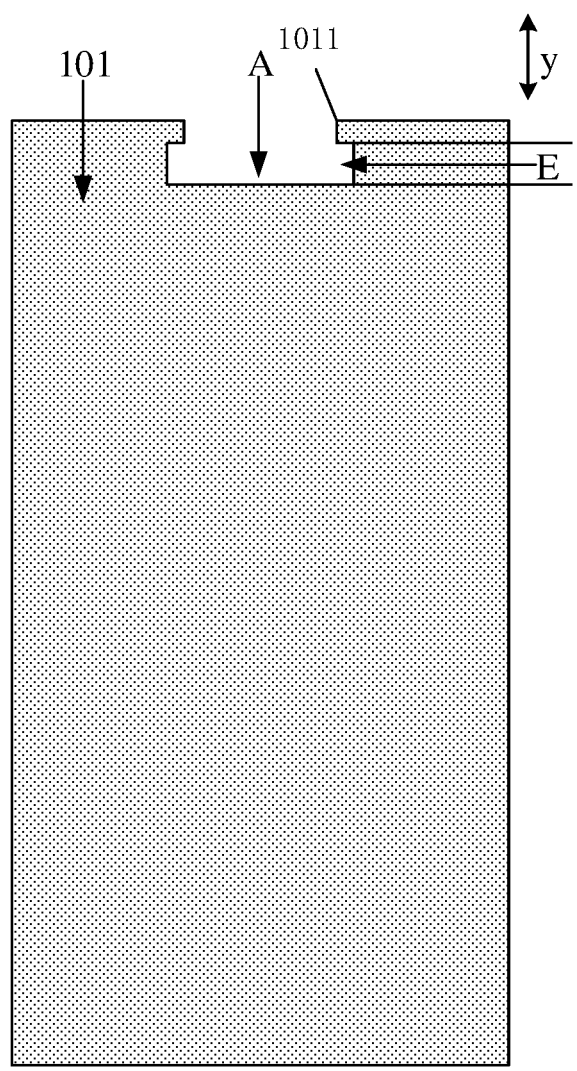
FIG. 8A is a cross-sectional view of an apparatus body provided by an embodiment of the present disclosure.

FIG. 8 shows a cross-sectional view of an apparatus body. As shown in FIG. 8A, an accommodating groove E may be formed on the side wall of a through groove A formed on the apparatus body, and the accommodating groove E does not communicate with a side where a third surface in the apparatus body 101 is positioned, so that when an external force is adopted to lift the device module to enable the telescopic part to extend, the telescopic part can be blocked by a protrusion 1011 of the through groove on the third surface, and the device module is prevented from being dragged away and even separated from the apparatus body; and a shape of the accommodating groove may be set according to a shape of the rotating head, and for example, when the rotating head is of a rectangle shape, the accommodating groove may be a rectangular column groove, and when the rotating head is of a circle shape, the accommodating groove may be a cylinder groove.

Moreover, a height h of the accommodating groove may be set according to size information of the device module, such as a height, a thickness and the like, so that when the external force is adopted to lift the device module, rotation of the device module can be implemented in a case that the rotating head is limited in the accommodating groove.

Figure 8B:
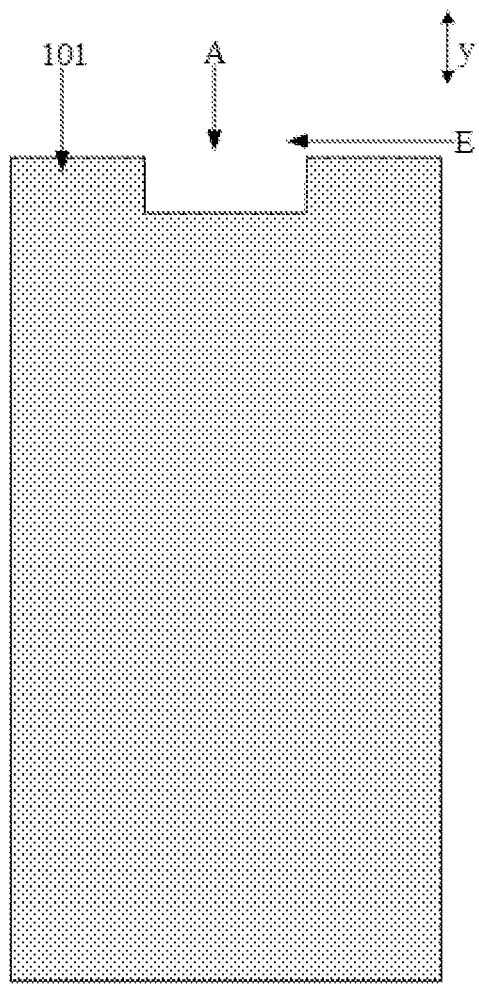
FIG. 8B is a cross-sectional view of another apparatus body provided by an embodiment of the present disclosure.

Alternatively, as shown in FIG. 8B, an accommodating groove E communicating with the third surface may be formed on the side wall of the through groove A formed on the apparatus body, and in this case, rotation of the device module also may be implemented, but due to no limitation of the protrusion on the third surface, if the external force is large, there may be a risk that the device module is separated from the apparatus body.

Alternatively, a part of the rotating shaft, the rotating head and the telescopic part also may be positioned in the accommodating groove.

In connection with FIG. 7 and FIG. 8, both the rotating head 1042 and the telescopic part 1043 may be positioned in the accommodating groove E, and the telescopic part 1043 may be connected with the apparatus body 101. The rotating head 1043 and the rotating shaft 1041 may move along a direction (the y direction) perpendicular to the third surface under the action of the external force, and drive the telescopic part 1043 to extend and retract along the direction perpendicular to the third surface. Exemplarily, the telescopic part may be a spring. When the device module is rotated, firstly, a pulling force may be applied to the device module, so that the device module moves towards the outside of the through groove and drives the rotating head and the rotating shaft to also move towards the outside of the through groove, and the spring is stretched; and then the device module may be rotated, and after the device module finishes rotating, the external force is released, so that the device module returns to the original position under a pulling force of the spring.

Alternatively, the telescopic part may be an electric telescopic rod, one end of the electric telescopic rod is fixed to the rotating shaft, the other end of the electric telescopic rod is fixed to the apparatus body, and the electric telescopic rod is connected to a stepping motor by a cam so as to extend or retract under the control of the stepping motor, thereby implementing movement of the device module away from or towards the apparatus body. At the moment, the stepping motor may be arranged in the device module or the apparatus body.

Alternatively, two connectors may be arranged, i.e., the connectors are arranged on both the left and right sides of the device module as shown in FIG. 8, but the number of the connectors also may be one, three and even more, which may be determined according to specific cases. When there are two connectors, the two connectors may be connected as one piece, or separately arranged.

Figure 9:
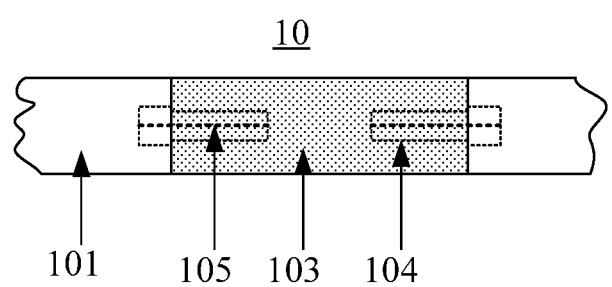
FIG. 9 is a top view of a display apparatus provided by an embodiment of the present disclosure.

FIG. 9 is a top view of a display apparatus provided by an embodiment of the present disclosure. In connection with FIG. 7 and FIG. 9, the display apparatus further may include a connecting wire 105, and the connecting wire 105 may pass through the hollow region B and the through hole C to be electrically connected with the device module 103 and the apparatus body 101. The apparatus body 101 and the device module 103 may carry out communication by the connecting wire, e.g., the apparatus body may send a rotating instruction to the device module so as to control the device module to automatically rotate; or the apparatus body also may send an instruction to the device module to indicate the auxiliary display screen to display specific information; or the apparatus body also may send an instruction to the device module to indicate the flash lamp to be turned on, indicate the camera to acquire an image and the like.

It should be noted that the display apparatus shown in FIG. 9 includes two connectors 104 and two groups of connecting wires 105, and both ends of the device module are respectively connected with the apparatus body by the two connectors. The two groups of connecting wires respectively pass through the through holes and the hollow regions of the two connectors, and both are electrically connected with the apparatus body and the device module. In the practical application, the display apparatus also may only include one connector and one group of connecting wires, the one group of connecting wires may pass through the through hole and the hollow region of the one connector and be electrically connected with the apparatus body and the device module, and a length of the rotating shaft in the one connector may be relatively large, so that the device module can be fixed by being sleeved with the rotating shaft; or, the display apparatus also may include two connectors and one group of connecting wires, the one group of connecting wires may pass through the through hole and the hollow region of any one of the two connectors and be electrically connected with the apparatus body and the device module, and the embodiments of the present disclosure do not make any limit thereto.

From the above, the device module in the display apparatus provided by the embodiments of the present disclosure includes: an auxiliary display screen and a functional device, and the functional device is positioned on a non-light-exiting direction of the auxiliary display screen; and the device module can rotate to enable the auxiliary display screen and the main display screen of the display apparatus to be positioned on the same side of the display apparatus. Therefore, when the functional device is not used, the auxiliary display screen and the main display screen may be positioned on the same side of the display apparatus, and at the moment, a total area of the display screen of the display apparatus, which can carry out displaying, is relatively large, i.e., the screen-to-body ratio of the display apparatus is increased, so as to improve the display effect of the display apparatus.

An embodiment of the present disclosure further provides an operating method of the display apparatus as mentioned above, including: when the functional device is not used, performing a relative rotation of the first display screen and the device module so as to enable the first display screen and the second display screen to be positioned on the same side of the display apparatus.

For example, the first display screen may be a main display screen, and the second display screen may be an auxiliary display screen.

For example, when a viewer faces the main display screen and needs to use the functional device, the first display screen and the device module are performed a relative rotation, so that the first display screen and the functional device are positioned on the same side of the display apparatus.

For example, when the functional device is not used, the performing a relative rotation of the first display screen and the device module so as to enable the first display screen and the second display screen to be positioned on the same side of the display apparatus includes: rotating the device module to enable the first display screen and the second display screen to be positioned on the same side of the display apparatus.

For example, the display apparatus further includes a connector, and the device module is connected with the apparatus body by the connector, wherein the connector includes: a rotating shaft; a rotating head, which is connected to the rotating shaft; and a telescopic part, which is connected to the rotating head and connected with the apparatus body, wherein the device module is pivoted with the connector by the rotating shaft, and is rotatable with respect to the rotating shaft, wherein the telescopic part is extendable and retractable along the direction perpendicular to the third surface, and rotating the device module to enable the first display screen and the second display screen to be positioned on the same side of the display apparatus includes: utilizing an external force to enable the telescopic part of the connector to extend along the direction perpendicular to the third surface, so that the device module moves away from the apparatus body along the direction perpendicular to the third surface; rotating the device module to enable the device module to rotate with respect to the apparatus body so as to enable the first display screen and the second display screen to be positioned on the same side of the display apparatus; and removing the external force to enable the telescopic part of the connector to retract, and driving the device module to be attached to the apparatus body.

For example, in a case that the telescopic part is an electric telescopic rod, a motor may be controlled by an application in the display apparatus to drive the electric telescopic rod to extend or retract, or a control button is separately arranged in the display apparatus to control the motor to drive the electric telescopic rod to extend or retract.

The technical solution provided by the embodiments of the present disclosure brings the beneficial effects at least including:

The device module in the display apparatus provided by the embodiments of the present disclosure includes: the auxiliary display screen and the functional device, and the functional device is positioned on the non-light-exiting direction of the auxiliary display screen; and the auxiliary display screen and the main display screen of the display apparatus may be positioned on the same side of the display apparatus by rotation. Therefore, when the functional device is not used, the auxiliary display screen and the main display screen can be positioned on the same side of the display apparatus, and at the moment, a total area of the display screen of the display apparatus, which can carry out displaying, is relatively large, i.e., the screen-to-body ratio of the display apparatus is increased, so as to improve the display effect of the display apparatus.

The following statements should be noted:

(1) The accompanying drawings involve only the structure(s) in connection with the embodiment(s) of the present disclosure, and other structure(s) may be referred to common design(s).

(2) For the purpose of clarity only, in accompanying drawings for illustrating the embodiment(s) of the present disclosure, the thickness of a layer or a region may be enlarged or reduced, that is, the accompanying drawings are not drawn according to the actual scale.

(3) In case of no conflict, features in one embodiment or in different embodiments can be combined to obtain a new embodiment.

In case of no conflict, embodiments of the present disclosure or features in one embodiment or in different embodiments can be combined.

What are described above is related to the specific embodiments of the disclosure only and not limitative to the scope of the disclosure. The protection scope of the disclosure shall be based on the protection scope of the claims.

The application claims priority to the Chinese patent application No. 201810368658.6, filed Apr. 23, 2018, the disclosure of which is incorporated herein by reference as part of the application.

The invention claimed is:

1. A display apparatus, comprising:
   an apparatus body;
   a first display screen, arranged on the apparatus body; and
   a device module, arranged on the apparatus body, the device module including:
      a second display screen; and
      a functional device, positioned in a non-light-exiting direction of the second display screen,
   wherein the first display screen and the device module are rotatable relatively, so that the first display screen and the second display screen are positioned on an identical side of the display apparatus,
   wherein the apparatus body has a first surface and a second surface which are arranged oppositely, and a third surface connecting the first surface and the second surface, and a through groove penetrating the first surface and the second surface is formed on the third surface,
   wherein the display apparatus further comprises a connector, the device module is connected with the apparatus body by the connector,
   wherein the connector is extendable and retractable along a direction perpendicular to the third surface,
   the connector includes:
      a rotating shaft;
      a rotating head, connected to the rotating shaft; and
      a telescopic part, connected to the rotating head and connected with the apparatus body,
   wherein the device module is pivoted with the connector by the rotating shaft, and is rotatable with respect to the rotating shaft,
   wherein the telescopic part is extendable and retractable along the direction perpendicular to the third surface.

2. The display apparatus according to claim 1, wherein the device module is rotatable with respect to the apparatus body, so that the first display screen and the second display screen are positioned on the identical side of the display apparatus.

3. The display apparatus according to claim 2, wherein the device module is rotatable to enable a light-exiting surface of the first display screen and a light-exiting surface of the second display screen to be coplanar.

4. The display apparatus according to claim 1, wherein the device module is rotatable with respect to the apparatus body, so that the second display screen is switchable between in the identical side of the apparatus body with the first display screen and in a different side from the first display screen.

5. The display apparatus according to claim 4, wherein the second display screen is switchable between in the identical side of the apparatus body with the first display screen and in an opposite side to the first display screen.

6. The display apparatus according to claim 1, wherein the functional device and the second display screen are arranged oppositely.

7. The display apparatus according to claim 1, wherein
the first display screen is arranged on the first surface, and the device module is arranged in the through groove.

8. The display apparatus according to claim 7, wherein the device module and the through groove are identical in size and shape.

9. The display apparatus according to claim 1, wherein the rotating shaft is fixed to the rotating head, the rotating head is fixed to the telescopic part, an accommodating groove is formed on a side wall of the through groove, and both the rotating head and the telescopic part are positioned in the accommodating groove.

10. The display apparatus according to claim 9, wherein the accommodating groove does not communicate with a side of the apparatus body where the third surface is positioned.

11. The display apparatus according to claim 9, further comprising: a connecting wire,
the connector comprises two connectors, and ends of the device module are connected with the apparatus body by the two connectors; the rotating shaft is of a hollow cylinder shape, and the rotating head is provided with a through hole corresponding to a hollow region in the rotating shaft; and
the connecting wire passes through the hollow region and the through hole, and is electrically connected with the apparatus body and the device module.

12. The display apparatus according to claim 1, wherein a surface of the device module which is close to the rotating head is a fourth surface, and a center of an orthographic projection region of the rotating head on the fourth surface of the device module coincides with a center of the fourth surface.

13. The display apparatus according to claim 1, wherein the rotating shaft is fixed to the rotating head, the rotating head is fixed to the telescopic part, an accommodating groove is formed on a side wall of the through groove, and the rotating head, the telescopic part, and a part of the rotating shaft are positioned in the accommodating groove.

14. The display apparatus according to claim 1, wherein the telescopic part is a spring, the functional device includes at least one of a camera, a flash lamp, and an earpiece.

15. The display apparatus according to claim 14, wherein the first display screen is a main display screen, and the second display screen is an auxiliary display screen.

16. An operating method of the display apparatus according to claim 1, comprising:
under a condition that the functional device is not used, performing a relative rotation of the first display screen and the device module, so as to enable the first display screen and the second display screen to be positioned on the identical side of the display apparatus.

17. The operating method of the display apparatus according to claim 16, wherein under the condition that the functional device is not used, the performing the relative rotation of the first display screen and the device module, so as to enable the first display screen and the second display screen to be positioned on the identical side of the display apparatus includes:
rotating the device module to enable the first display screen and the second display screen to be positioned on the identical side of the display apparatus.

18. The operating method of the display apparatus according to claim 17, wherein
the rotating the device module to enable the first display screen and the second display screen to be positioned on the identical side of the display apparatus includes:
extending the telescopic part of the connector along the direction perpendicular to the third surface by utilizing an external force, to enable the device module to be away from the apparatus body along the direction perpendicular to the third surface;
rotating the device module with respect to the apparatus body so as to enable the first display screen and the second display screen to be positioned on the identical side of the display apparatus; and
retracting the telescopic part of the connector and driving the device module to be attached to the apparatus body by removing the external force.

\* \* \* \* \*